United States Patent
Oh et al.

(10) Patent No.: US 7,967,404 B2
(45) Date of Patent: Jun. 28, 2011

(54) DISPLAY UNIT INSTALLING STRUCTURE FOR REFRIGERATOR

(75) Inventors: Seung-jin Oh, Daegu (KR); Soo-beom Lee, Changwon (KR); Ki-cheol Woo, Masan (KR); Ik-kyu Lee, Changwon (KR); Jin-hyun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 909 days.

(21) Appl. No.: 11/722,795

(22) PCT Filed: Dec. 23, 2005

(86) PCT No.: PCT/KR2005/004513
§ 371 (c)(1),
(2), (4) Date: Jun. 25, 2007

(87) PCT Pub. No.: WO2006/068456
PCT Pub. Date: Jun. 29, 2006

(65) Prior Publication Data
US 2007/0290588 A1    Dec. 20, 2007

(30) Foreign Application Priority Data

| Dec. 24, 2004 | (KR) | 10-2004-0112358 |
| Dec. 24, 2004 | (KR) | 10-2004-0112359 |
| Dec. 24, 2004 | (KR) | 10-2004-0112360 |
| Dec. 24, 2004 | (KR) | 10-2004-0112361 |
| Dec. 27, 2004 | (KR) | 10-2004-0113279 |
| Dec. 29, 2004 | (KR) | 10-2004-0115744 |
| Jan. 28, 2005 | (KR) | 10-2005-0008109 |
| Jan. 28, 2005 | (KR) | 10-2005-0008111 |
| Jan. 31, 2005 | (KR) | 10-2005-0008722 |
| Jan. 31, 2005 | (KR) | 10-2005-0008723 |
| Jan. 31, 2005 | (KR) | 10-2005-0008724 |
| Jan. 31, 2005 | (KR) | 10-2005-0008777 |

(51) Int. Cl.
*A47B 96/04*    (2006.01)
(52) U.S. Cl. ............... 312/405.1; 312/282; 312/321.5
(58) Field of Classification Search ............... 312/405, 312/405.1, 280, 282, 321.5; 62/331, 440, 62/377; 248/126, 299.1, 224.7, 222.51
See application file for complete search history.

(56) References Cited

U.S. PATENT DOCUMENTS

| 419,521 | A | * | 1/1890 | Heald et al. ............... 248/485 |
| 1,830,308 | A | * | 11/1931 | Zepke ............... 248/277.1 |
| 2,825,152 | A | * | 3/1958 | Baylon ............... 434/430 |

(Continued)

FOREIGN PATENT DOCUMENTS

CN    1257353    6/2000

(Continued)

*Primary Examiner* — Darnell M Jayne
*Assistant Examiner* — Dan Rohrhoff
(74) *Attorney, Agent, or Firm* — Birch, Stewart, Kolasch & Birch, LLP

(57) ABSTRACT

A display unit installing structure for a refrigerator includes an accommodating unit which is formed by depressing a portion on a front surface of a door and in which a display unit for displaying a variety of information thereon and inputting operating signals are retractably installed; a link mechanism for guiding accommodation and withdrawal of the display unit and tiltably supporting the display unit withdrawn from the accommodating unit at a predetermined angle; and a locking arrangement for preventing the display unit from being inadvertently escaping from the accommodating unit. The display unit can be retractably installed on the front surface of the refrigerator door.

3 Claims, 16 Drawing Sheets

U.S. PATENT DOCUMENTS

| | | | |
|---|---|---|---|
| 3,113,996 A * | 12/1963 | Sanford | 174/67 |
| 4,814,759 A * | 3/1989 | Gombrich et al. | 345/60 |
| 5,321,579 A * | 6/1994 | Brown et al. | 361/679.06 |
| 6,430,946 B2 * | 8/2002 | Roh et al. | 62/125 |
| 6,692,093 B1 * | 2/2004 | Park et al. | 312/405.1 |
| 6,905,101 B1 * | 6/2005 | Dittmer | 248/274.1 |
| 7,143,599 B2 * | 12/2006 | Wo | 62/259.2 |
| 7,155,923 B2 * | 1/2007 | Nam et al. | 62/259.2 |
| 7,364,127 B2 * | 4/2008 | Huang | 248/276.1 |
| 7,395,996 B2 * | 7/2008 | Dittmer | 248/291.1 |
| 7,430,111 B2 * | 9/2008 | Lee et al. | 361/679.27 |
| 7,546,745 B2 * | 6/2009 | Lee et al. | 62/125 |
| 7,555,910 B2 * | 7/2009 | Oh et al. | 62/126 |
| 7,607,743 B2 * | 10/2009 | Jang | 312/405 |
| 2001/0052741 A1 * | 12/2001 | Yun | 312/405 |
| 2003/0154673 A1 | 8/2003 | MacGregor et al. | |
| 2004/0216471 A1 | 11/2004 | Kim et al. | |
| 2006/0125360 A1 * | 6/2006 | Kim et al. | 312/405.1 |
| 2006/0152121 A1 * | 7/2006 | Son et al. | 312/405 |
| 2006/0226751 A1 * | 10/2006 | Park | 312/405.1 |
| 2007/0164646 A1 * | 7/2007 | Raab | 312/405.1 |
| 2007/0295020 A1 * | 12/2007 | Lee | 62/259.2 |
| 2008/0165282 A1 * | 7/2008 | Marcy et al. | 348/552 |
| 2008/0278049 A1 * | 11/2008 | Park et al. | 312/405 |
| 2008/0297019 A1 * | 12/2008 | Kim | 312/405 |
| 2009/0289536 A1 * | 11/2009 | Park et al. | 312/405 |
| 2010/0037638 A1 * | 2/2010 | Ok | 62/125 |

FOREIGN PATENT DOCUMENTS

| | | |
|---|---|---|
| CN | 1683854 A | 10/2005 |
| DE | 20 2004 012 298 U1 | 11/2004 |
| JP | 08-098116 | 4/1996 |
| JP | 2001-215078 A | 8/2001 |
| KR | 10-2002-0029506 A | 4/2002 |
| KR | 10-0464265 | 12/2004 |
| KR | 10-0464265 B1 | 12/2004 |
| KR | 2005-0011726 A | 6/2005 |
| KR | 2005-0058151 A | 6/2005 |
| KR | 2006-0011726 A | 2/2006 |
| KR | 2006-0011727 A | 2/2006 |
| WO | WO 2004/002282 A2 | 1/2004 |
| WO | WO 2005/120053 A1 | 12/2005 |

* cited by examiner

Prior Art
【Figure 1】
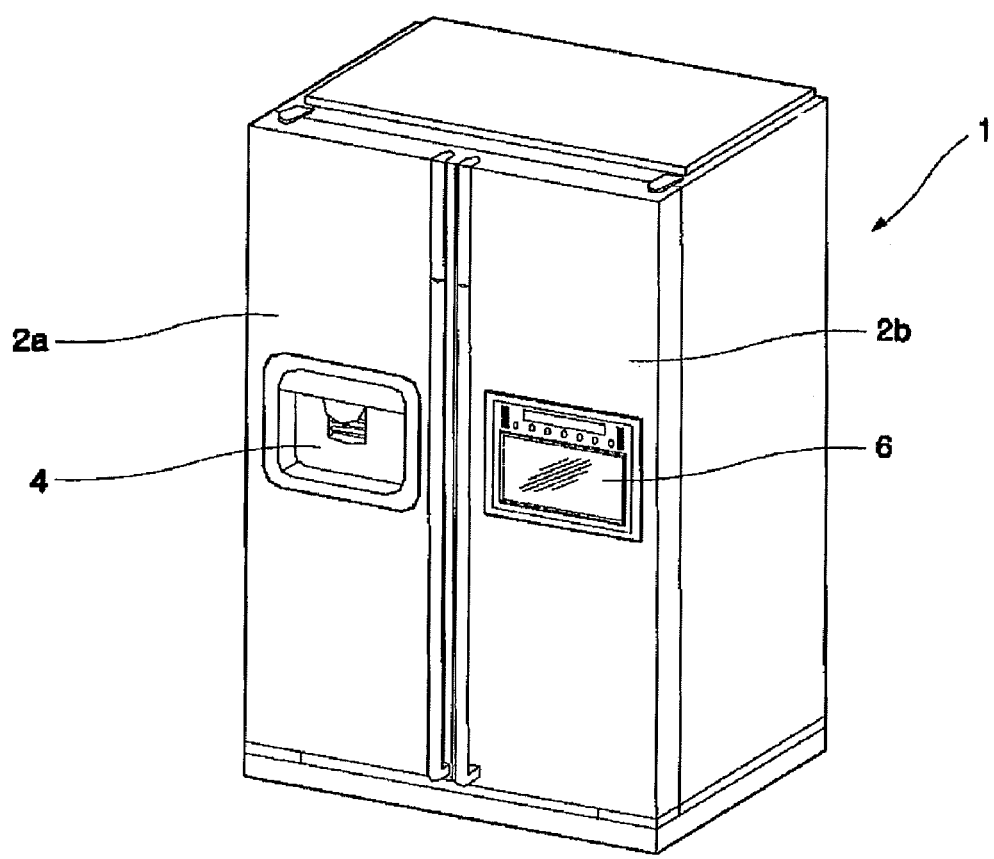

[Figure 2]
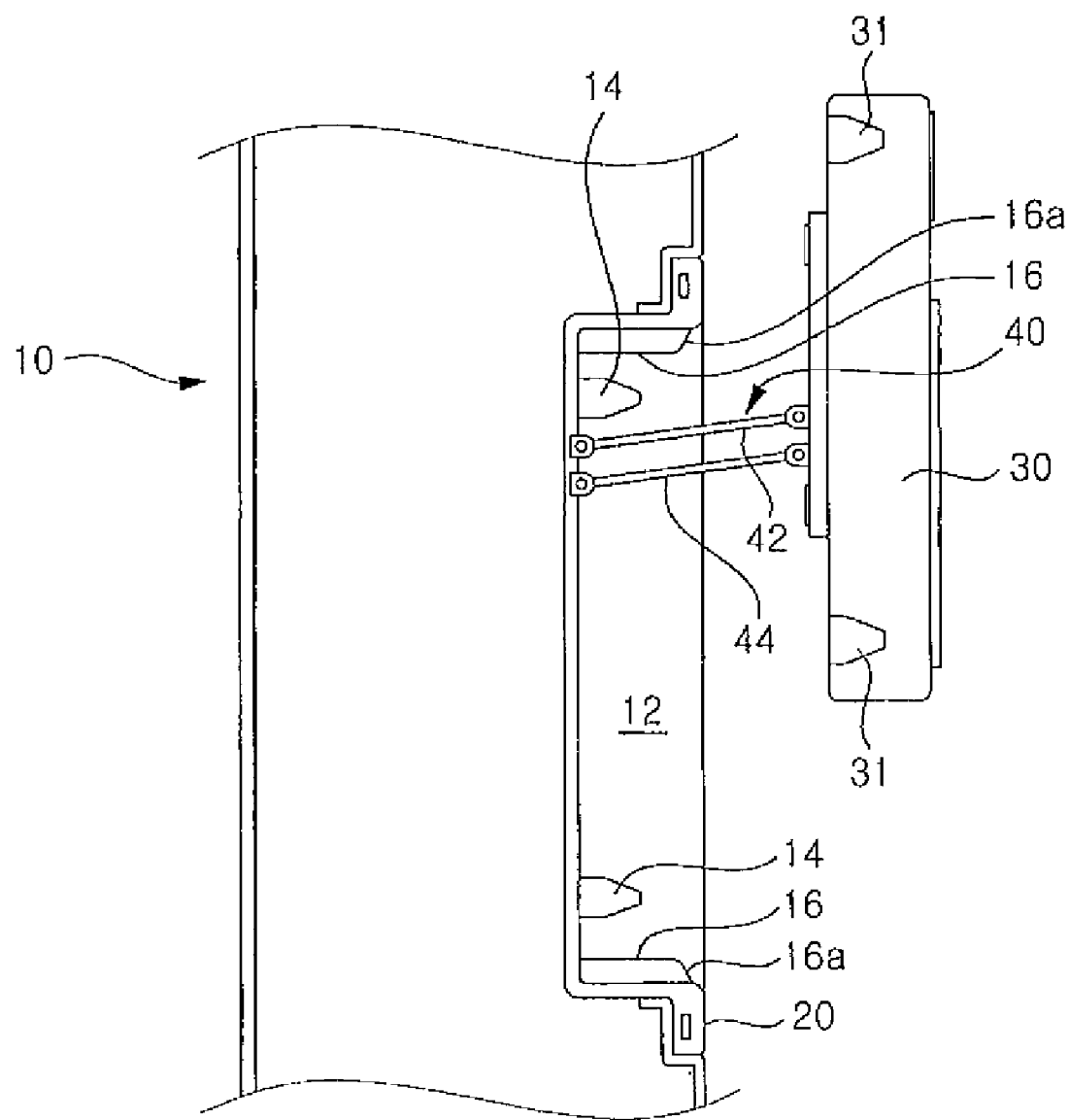

[Figure 3]
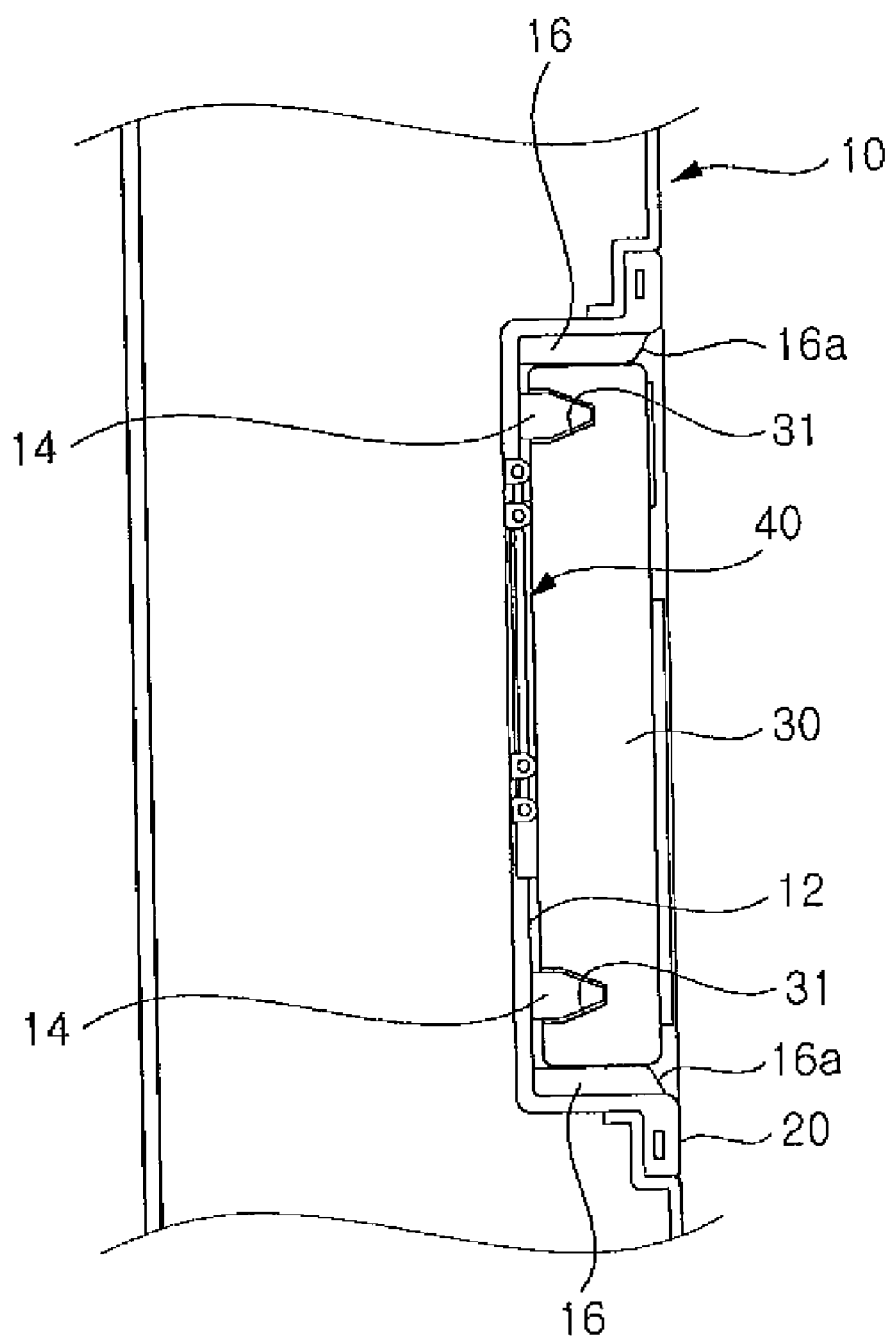

[Figure 4]
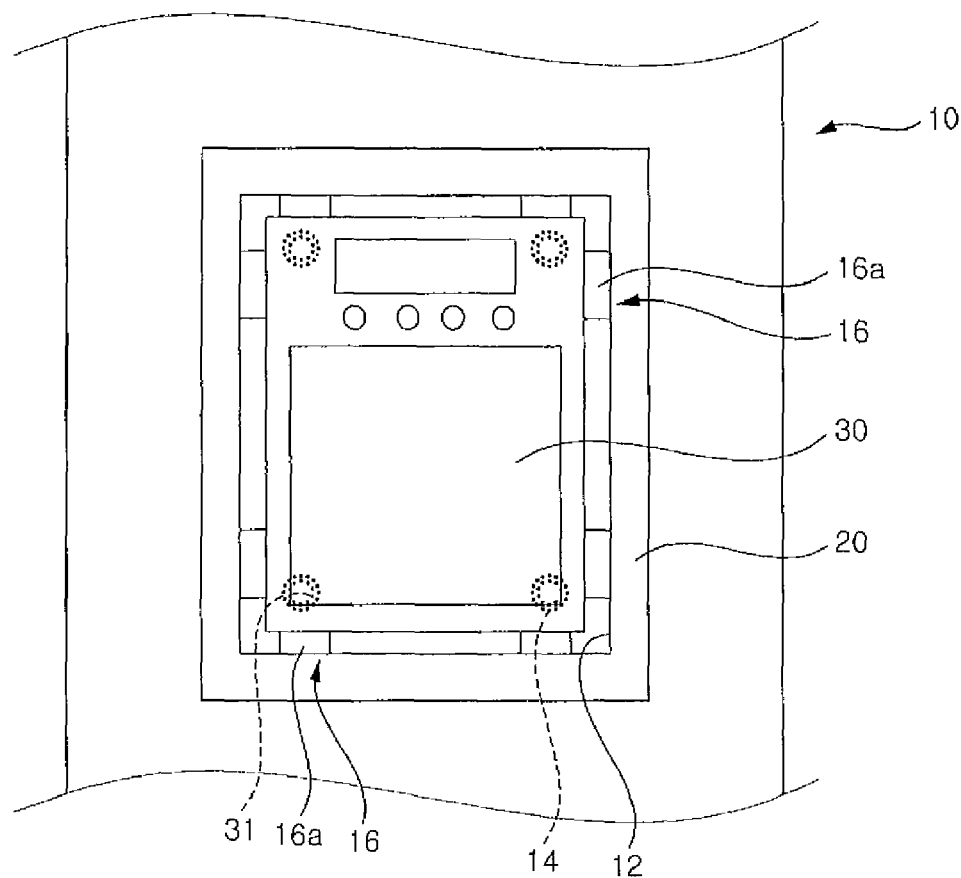

[Figure 5]
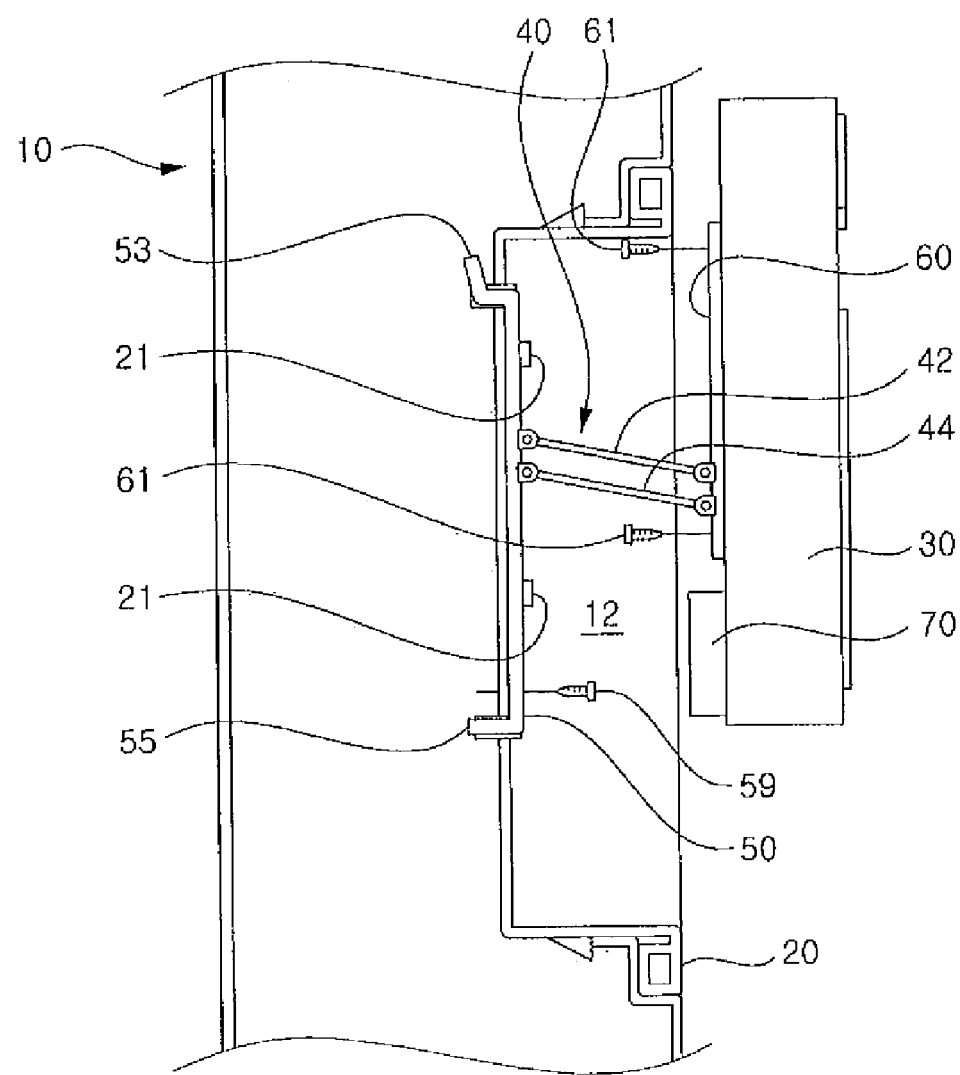

[Figure 6]
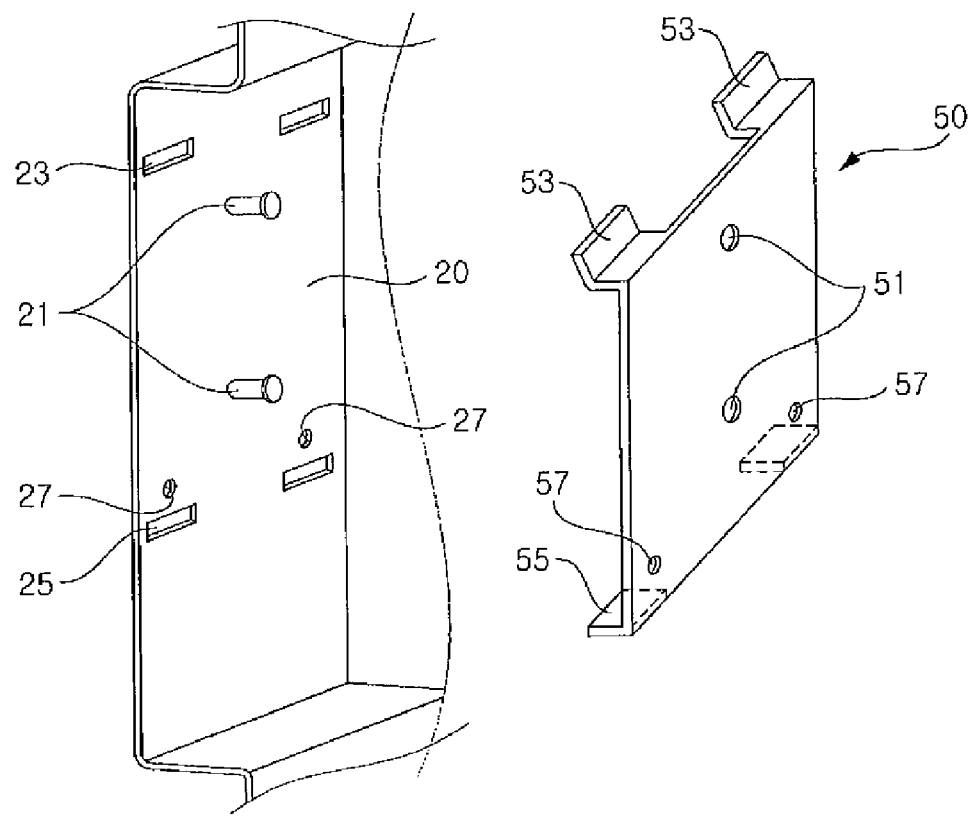

[Figure 7]
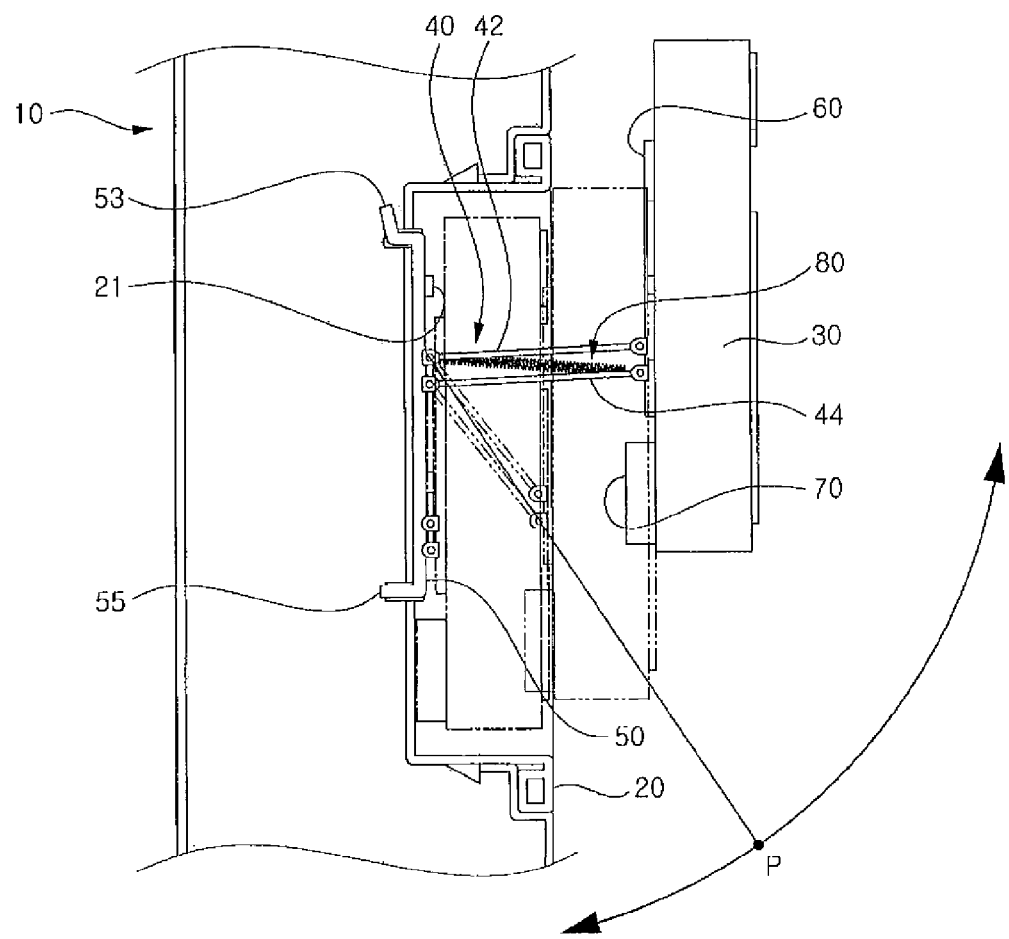

[Figure 8]
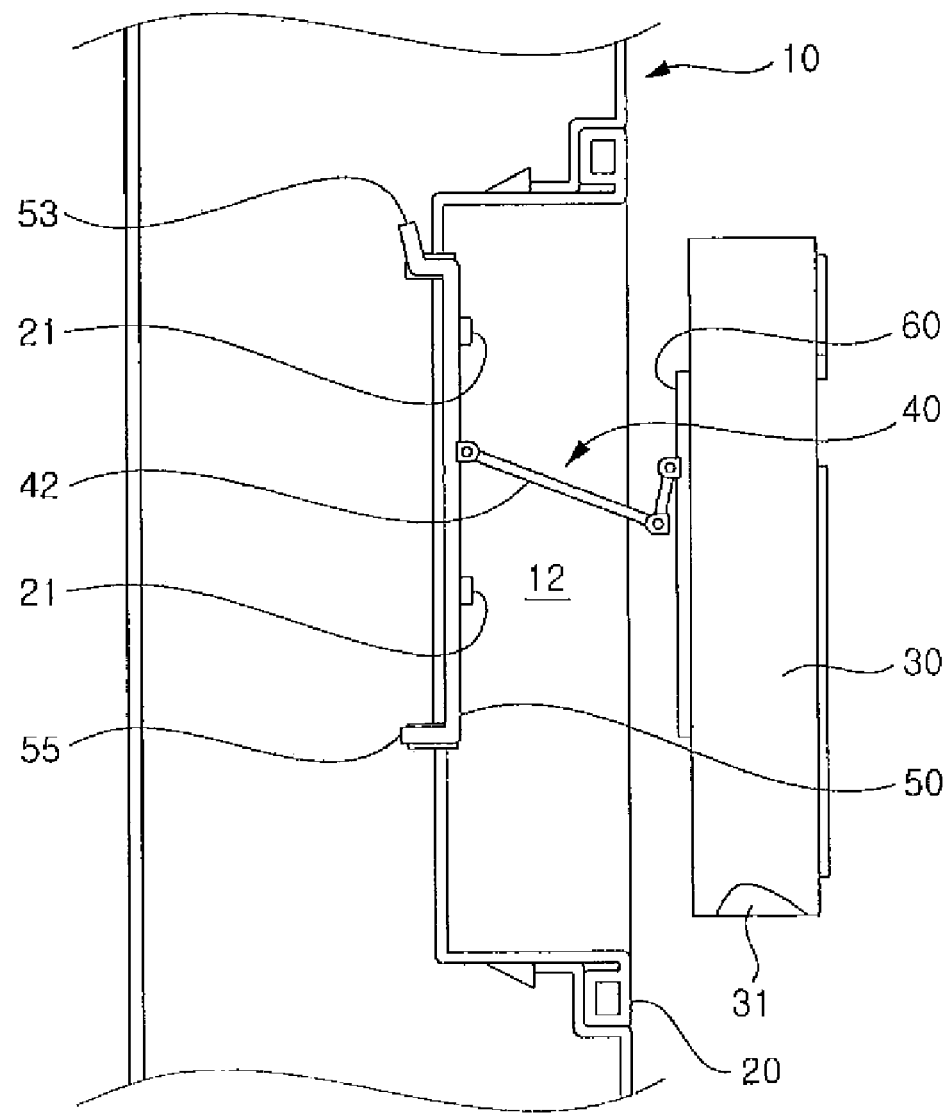

[Figure 9]
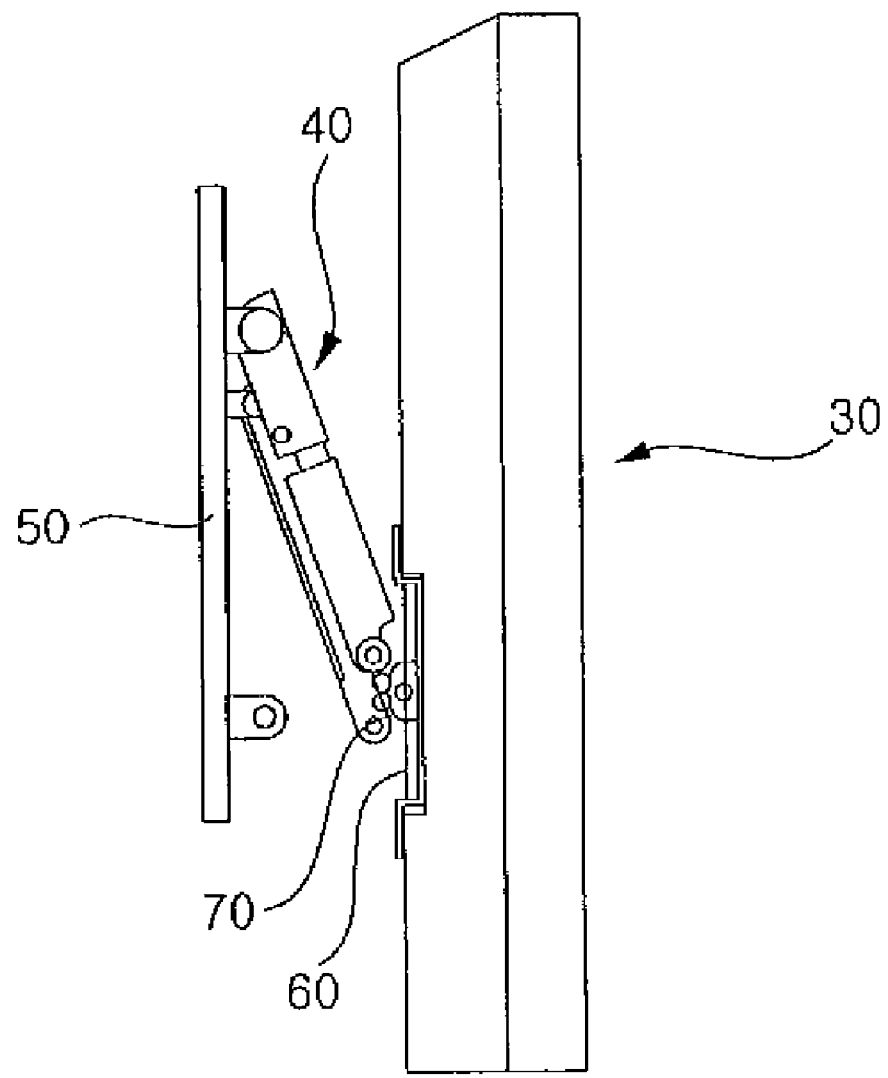

[Figure 10]
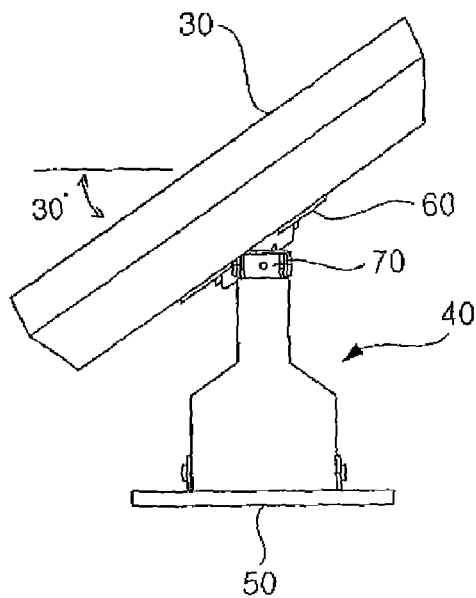
[Figure 11]
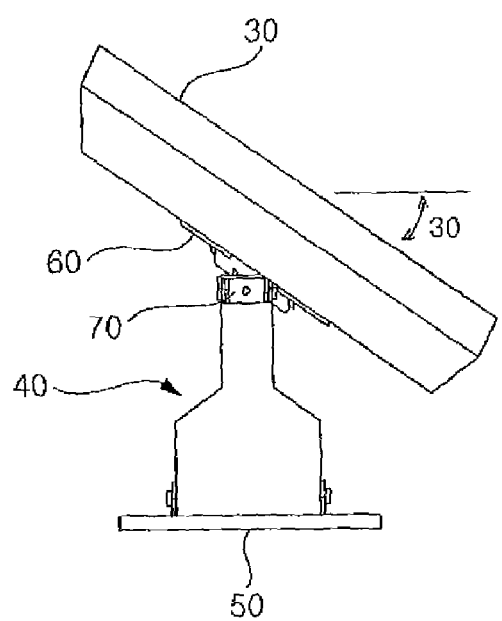

[Figure 12]
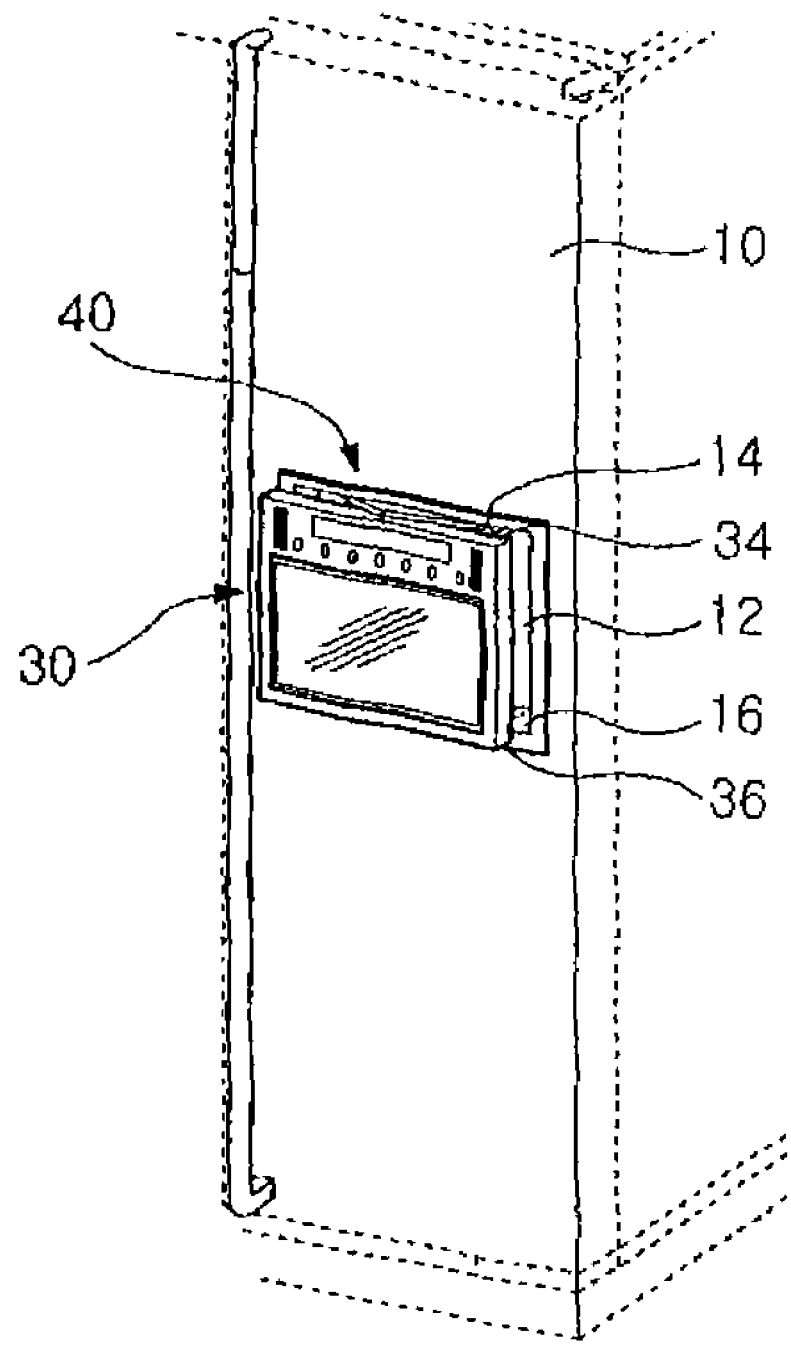

[Figure 13]
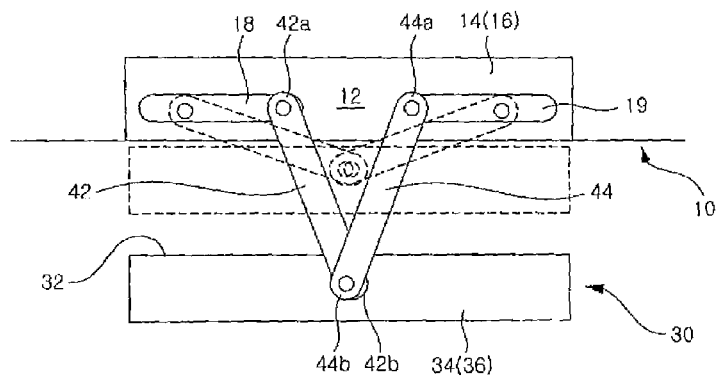
[Figure 14]
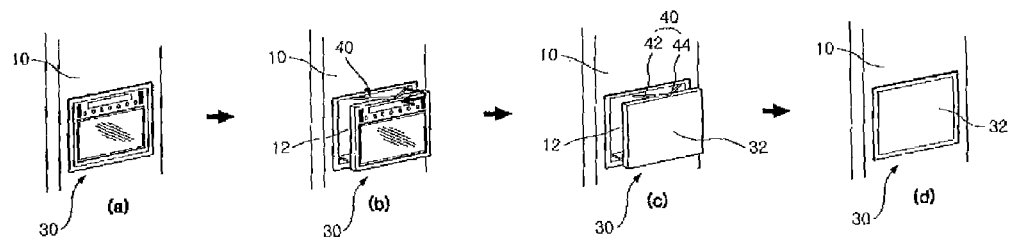
[Figure 15]
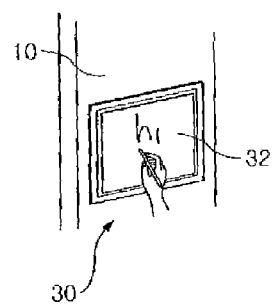

[Figure 16]
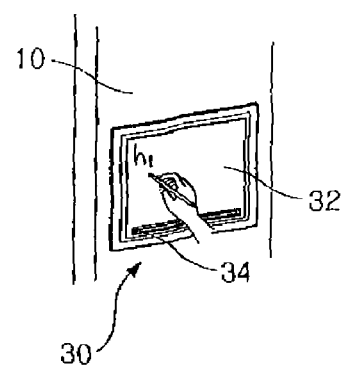
[Figure 17]
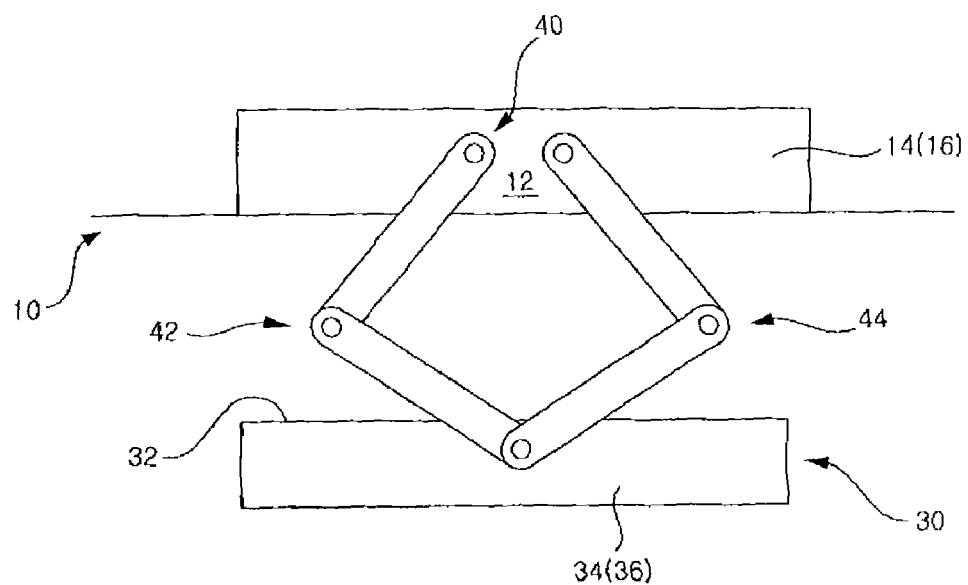

[Figure 18]
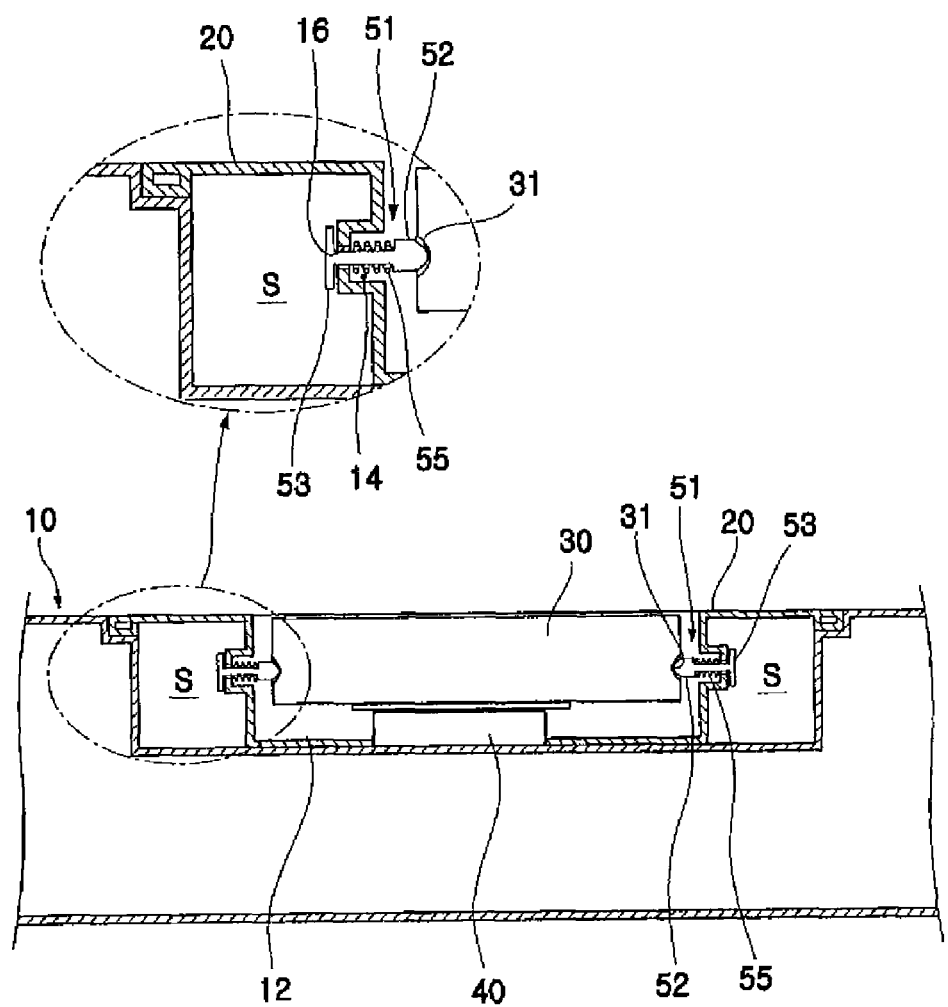

【Figure 19】
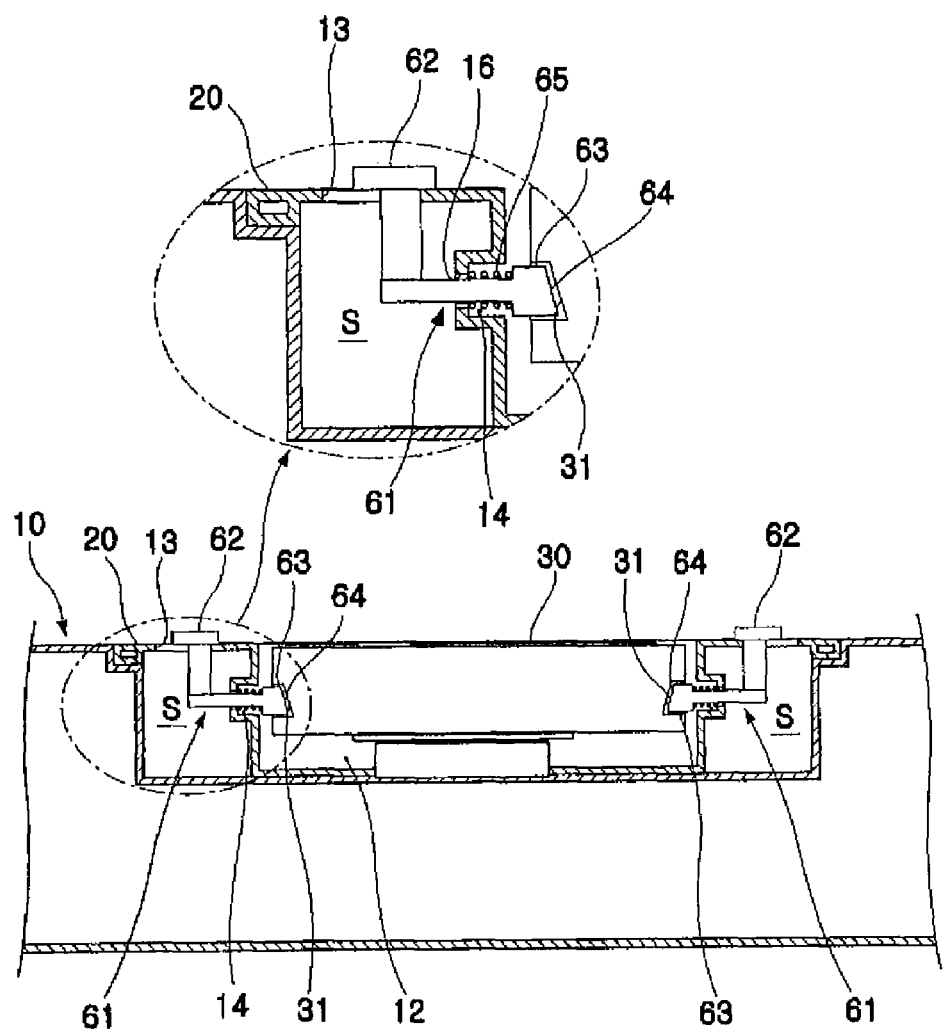

[Figure 20]
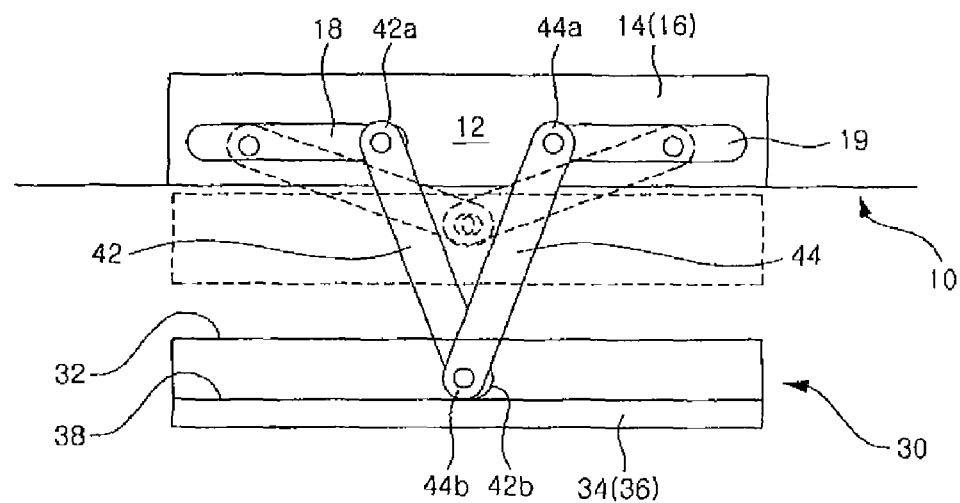
[Figure 21]
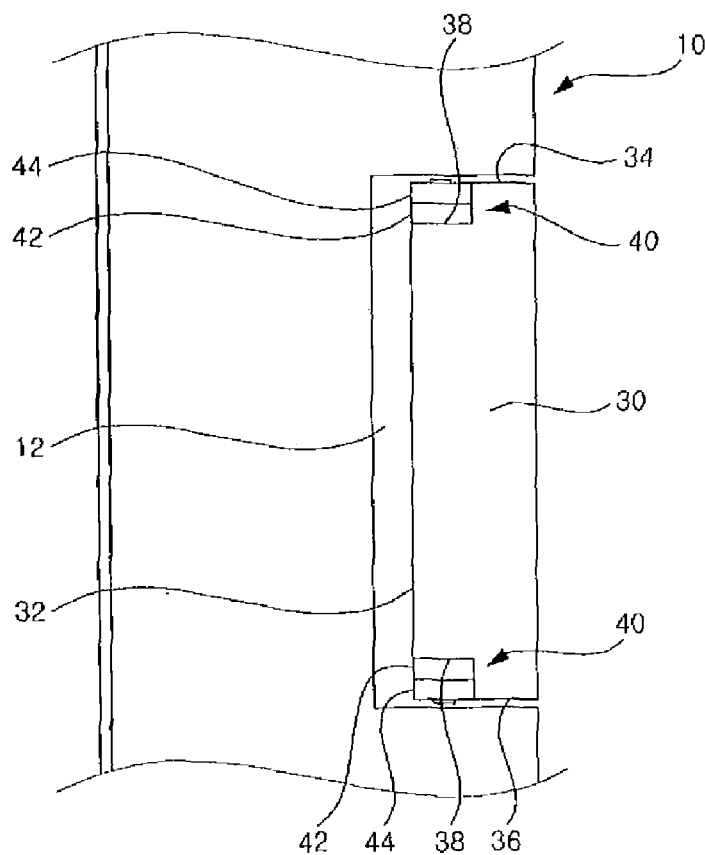

DISPLAY UNIT INSTALLING STRUCTURE FOR REFRIGERATOR

TECHNICAL FIELD

The present invention relates to a refrigerator, and more particularly, to a display unit installing structure for a refrigerator which can be used to retractably mount a display unit to a portion on a refrigerator door.

BACKGROUND ART

Refrigerators are household appliances for storing foods in a refrigerating or freezing chamber thereof in a refrigerated or frozen state. In addition to a traditional function of storing foods therein, recently available refrigerators are provided with additional devices such as a dispenser and home bar to allow a user to withdraw water or foods stored in the refrigerator without opening the door, so that their convenience of user can be increased. Further, refrigerators may be provided with a display unit on which a variety of information can be displayed and operating signals can be inputted.

FIG. 1 shows a refrigerator mounted with a display unit according to a prior art.

As shown in the figure, a main body 1 of a refrigerator is provided with a storage space divided into a refrigerating chamber and a freezing chamber. The refrigerator shown in FIG. 1 is a side-by-side refrigerator in which the freezing and refrigerating chambers are formed from side to side. Such freezing and refrigerating chambers are selectively opened and closed by a freezing chamber door 2a and a refrigerating chamber door 2b, respectively.

A dispenser 4 is installed at a portion of the freezing chamber door 2a. The dispenser 4 allows a user to take water out from the refrigerator without opening the freezing or refrigerating chamber door 2a or 2b.

Further, a display unit 6 is mounted to the refrigerating chamber door 2b. The display unit 6 is used to display information about the refrigerator operation, to output images and sounds or to connect to the Internet. The display unit 6 receives a variety of operating signals required for performing the aforementioned operations. The display unit 6 is fixed to a refrigerator in a state where it is installed in an accommodating unit provided on a front surface of the refrigerating chamber door 2b.

However, the conventional display unit installing structure for a refrigerator so configured has the following problems.

As described above, the display unit 6 is mounted on the front surface of the refrigerating chamber door 2b. That is, the display unit is mounted such that a user can have the best field of vision as viewed from the front. Nevertheless, since the display unit is fixed to the front surface of the refrigerating chamber door 2b, there is a disadvantage in that an inferior filed of vision may be obtained depending on positions of the user.

Further, since the display unit is fixed to the front surface of the refrigerating chamber door 2b, the external appearance of the refrigerating chamber door 2b cannot be further changed in a state where the display unit 6 is fixed. Therefore, since there is no possibility of the change in design of the external appearance of the refrigerator, the external appearance of the front surface of the refrigerator becomes monotonous.

In addition, if the display unit 6 is fixed to the front surface of the refrigerating chamber door 2b, heat generated while the display unit 6 is operated may be transferred to the interior of the refrigerator through the refrigerating chamber door 2b. Moreover, there is a problem in that it is difficult to release heat from the display unit 6.

Furthermore, the display unit 6 is generally configured in such a manner that it front surface, i.e. a portion thereof in which a liquid crystal is provided, is always directed to the front surface of the door 2b. Therefore, since the front surface of the display unit 6 is exposed to the outside even when the display unit 6 is not being used for the purpose of transport or storage of the refrigerator, the display unit may be damaged due to external shock or contaminated with foreign substances.

Still furthermore, in a case where a user intends to make a note in a kitchen where the refrigerator is installed, he/she should attach a piece of paper to front or side surfaces of the refrigerator or utilize an additional board or the like.

DISCLOSURE

Technical Problem

The present invention is conceived to solve the aforementioned problems in the prior art. Accordingly, an object of the present invention is to provide a display unit installing structure for a refrigerator configured to obtain a better field of vision regardless of positions of a user.

Another object of the present invention is to provide a display unit installing structure for a refrigerator configured such that heat transfer between a display unit and the interior of the refrigerator can be blocked as well as efficient heat radiation from the display unit can be made.

A further object of the present invention is to provide a display unit installing structure for a refrigerator configured such that the design of an external appearance of a refrigerator door can be changed in various ways.

A still further object of the present invention is to provide a display unit installing structure for a refrigerator configured such that a display unit can be safely protected from external shock when the display unit is not used.

A still further object of the present invention is to provide a display unit installing structure for a refrigerator configured to be capable of making a short note thereon.

A still further object of the present invention is to provide a display unit installing structure for a refrigerator configured such that a display unit received in a door can be maintained at a more stable state.

Technical Solution

According to an aspect of the present invention for achieving the objects, there is provided a display unit installing structure for a refrigerator, comprising an accommodating unit which is formed by depressing a portion on a front surface of a door and in which a display unit for displaying a variety of information thereon and inputting operating signals are retractably installed, a link mechanism for guiding accommodation and withdrawal of the display unit and tiltably supporting the display unit withdrawn from the accommodating unit at a predetermined angle, and a locking means for preventing the display unit from being inadvertently escaping from the accommodating unit.

The locking means may include at least one locking protrusion provided on one of the accommodating unit and the display unit, and at least one locking groove provided on the other of the accommodating unit and display unit such that the locking protrusion is selectively inserted in the locking groove as the display unit is received in or withdrawn from the accommodating unit.

Preferably, the locking protrusion is shaped as a taper of which diameter is decreased from a base toward a tip end thereof, and the locking groove is shaped as a taper corresponding to the shape of the locking protrusion.

Preferably, the locking protrusion and groove are protruded from a bottom surface of the accommodating unit and depressed into a rear surface of the display unit, respectively, in accordance with a trajectory along which the display unit is received into or withdrawn from the accommodating unit by means of the link mechanism.

The locking means may include a magnet provided at one of the accommodating unit and the display unit to come into close contact with the other of the accommodating unit and the display unit, which are made of metal, due to a magnetic force when the display unit is received in the accommodating unit.

The display unit installing structure may further comprise a guide means for guiding the display unit to be received in the accommodating unit.

The guide means may include at least one pair of guide ribs which are provided on opposite side surfaces of the accommodating unit and brought into close contact with side surfaces of the display unit received in the accommodating unit to support the display unit thereon.

Preferably, the guide rib is formed by protruding a portion of the side surface of the accommodating unit in an opposite direction and a guide surface inclined to be flared outwardly is provided at an outer end of the guide rib to guide the accommodation and withdrawal of the display unit.

The link mechanism may include at least one link member of which both ends are pivotally connected to a bottom surface of the accommodating unit and a rear surface of the display unit, respectively.

The link member may include first and second link members arranged in parallel with each other in a vertical or horizontal direction.

Preferably, each of the first and second link members is a multi-point linkage.

Preferably, both ends of the link member are pivotally connected to a front surface of a bracket detachably installed at the bottom surface of the accommodating unit and a rear surface of a mounting plate fixed to the rear surface of the display unit, respectively.

Preferably, at least one pair of fastening slots are formed on the bottom surface of the accommodating unit to be parallel with and spaced apart from each other by a predetermined distance, and fastening and locking pieces are formed on the rear surface of the bracket to be inserted in the fastening slots, respectively.

Preferably, the fastening piece is formed such that it extends perpendicular to the rear surface of the bracket corresponding to one pair of the fastening slots and a tip portion thereof is then bent to be inclined upward at a predetermined angle, and the locking piece is formed such that it extends perpendicular to the rear surface of the bracket corresponding to the other pair of the fastening slots.

More preferably, at least one positioning protrusion is provided on one of the bottom surface of the accommodating unit or the rear surface of the bracket, and at least one positioning hole is formed in the other of the bottom surface of the accommodating unit or the rear surface of the bracket such that the positioning protrusion can be fitted into the positioning hole only when the bracket is correctly positioned while the bracket is installed on the bottom surface of the accommodating unit.

The display unit installing structure may further comprise a coil spring of which both ends are fixed to the bottom surface of the accommodating unit and the rear surface of the display unit, respectively, and which is maximally stretched at a middle point between a state where the display unit is received and a state where the display unit is fully withdrawn.

Alternatively, the display unit installing structure may further comprise a coil spring of which both ends are fixed to one end of the first link member corresponding to one of the bottom surface of the accommodating unit and the rear surface of the display unit and to one end of the second link member corresponding to the other of the bottom surface of the accommodating unit and the rear surface of the display unit, respectively, and which is maximally stretched at a middle point between a state where the display unit is received and a state where the display unit is fully withdrawn.

Preferably, the accommodating unit is defined by a recess member provided on the front surface of the door.

The display unit installing structure may further comprise a connector capable of tiltably connecting the display unit with respect to the link mechanism.

Preferably, a handle gripped when a user withdraws the display unit from the accommodating unit is provided on a bottom surface of the display unit.

According to another aspect of the present invention, there is provided a display unit installing structure for a refrigerator, comprising an accommodating unit which is formed by depressing a portion on a front surface of a door and in which a display unit for displaying a variety of information thereon and inputting operating signals are retractably installed; a link mechanism for guiding accommodation and withdrawal of the display unit and pivotally supporting the display unit withdrawn from the accommodating unit in a horizontal direction, the link mechanism including at least one pair of first link members of which one end is pivotally connected to the accommodating unit and at least one pair of second link members of which both ends are pivotally connected to a point on a top or bottom surface of the display unit and the other end of the first link member, respectively; and a locking means provided on one side of the accommodating unit and one corresponding side of the display unit to prevent the display unit from being inadvertently escaping from the accommodating unit.

According to a further aspect of the present invention, there is provided a display unit installing structure for a refrigerator, comprising an accommodating unit which is formed by depressing a portion on a front surface of a door and in which a display unit for displaying a variety of information thereon and inputting operating signals are retractably installed; a link mechanism for guiding accommodation and withdrawal of the display unit and pivotally supporting the display unit withdrawn from the accommodating unit in a horizontal direction, the link mechanism including at least one pair of link members of which one end is pivotally connected to the accommodating unit while being movable in a horizontal direction and the other end is pivotally connected to a point on a top or bottom surface of the display unit; and a locking means provided on one side of the accommodating unit and one corresponding side of the display unit to prevent the display unit from being inadvertently escaping from the accommodating unit.

Preferably, a rear surface of the display unit is made of the same material as the front surface of the door.

Preferably, a white board capable of making a note or erasing the note is provided on a rear surface of the display unit.

Preferably, a memo board is provided on a rear surface of the display unit and comprises a base plate formed on the rear surface of the display unit to correspond to the surface shape of the display unit, a film with a rear surface thereof brought into close contact with a front surface of the base plate to allow a user to make a note thereon, and an eraser lever for erasing the note by separating the film from the base plate.

The locking means may comprise a stopper movably installed on one of side surfaces of the accommodating unit and display unit in a direction perpendicular to a direction in which the display unit is received in the accommodating unit, a stopping groove formed on the other of the side surfaces of the accommodating unit and display unit to allow the stopper to be selectively inserted therein, and an elastic member for imparting an elastic force to the stopper in a direction in which the stopper is inserted in the stopping groove.

Preferably, a tip end of the stopper is shaped as a spherical surface such that the stopper does not hinder the display unit from being received in the accommodating unit.

Alternatively, the locking means may comprise an operating lever installed to penetrate the front surface of the door such that a portion of the lever protrudes forward from the door to be movable in a vertical or horizontal direction; a catching protrusion provided on one end of the operating lever such that at least a portion of the catching protrusion is positioned within the accommodating unit; a catching groove formed at a side surface of the display unit such that the catching protrusion can be selectively inserted in the catching groove by moving the operating lever in a state where the display unit is received in the accommodating unit; and an elastic member for imparting an elastic force to the catching protrusion in a direction in which the catching protrusion is inserted in the catching groove.

Preferably, an inclined guide surface is provided on a tip end of the catching protrusion such that the catching protrusion does not hinder the display unit from being received in the accommodating unit.

More preferably, a seating groove is formed on a top and/or bottom surface of the display unit by depressing a portion of a rear end on the top and/or bottom surface in an upward or downward direction, the seating groove is pivotally connected to an end of the link member, and the link mechanism is seated in the seating groove in a state where the display unit is received in the accommodating unit.

Advantageous Effects

According to the present invention so configured, the display unit can be retractably mounted to the front surface of the refrigerator door. Therefore, there are some advantages in that a better field of vision can be substantially obtained enough for a user to view the display unit regardless of positions of the user, the heat transfer between the display unit and the interior of the refrigerator can be blocked, heat radiation efficiency of the display unit can also be improved, the design of the refrigerator door can be provided in various ways, and the display unit can be kept at a more stable state.

DESCRIPTION OF DRAWINGS

FIG. 1 is a perspective view showing an external appearance of a refrigerator mounted with a display unit according to a prior art.

FIG. 2 is a side sectional view showing a state where a display unit is withdrawn by using a display unit installing structure for a refrigerator according to a first embodiment of the present invention.

FIG. 3 is a side sectional view showing a state where the display unit is accommodated according to the first embodiment shown in FIG. 2.

FIG. 4 is a front view showing a state where the display unit is accommodated according to the first embodiment shown in FIG. 2.

FIG. 5 is a side sectional view showing a state where a display unit is withdrawn by using a display unit installing structure for a refrigerator according to a second embodiment of the present invention.

FIG. 6 is an exploded perspective view showing the configuration of a rear surface of an accommodating unit and a bracket constituting the second embodiment shown in FIG. 5.

FIG. 7 is a side sectional view showing a process of accommodating and/or withdrawing a display unit according to the second embodiment shown in FIG. 5.

FIG. 8 is a side sectional view showing a third embodiment of a display unit installing structure for a refrigerator according to the present invention.

FIG. 9 is a side sectional view showing a fourth embodiment of a display unit installing structure for a refrigerator according to the present invention.

FIGS. 10 and 11 are plan views showing an operating state of the display unit installing structure according to the embodiment shown in FIG. 9.

FIG. 12 is a perspective view showing major components of a refrigerator to which a display unit is mounted by using a display unit installing structure for a refrigerator according to a fifth embodiment of the present invention.

FIG. 13 is a plan view of the embodiment shown in FIG. 12.

FIG. 14 is a perspective view showing a process of operating a display unit mounted by using the display unit installing structure according to the embodiment shown in FIG. 12.

FIG. 15 is a perspective view showing a sixth embodiment of a display unit installing structure for a refrigerator according to the present invention.

FIG. 16 is a perspective view showing a seventh embodiment of a display unit installing structure for a refrigerator according to the present invention.

FIG. 17 is a plan view showing an eighth embodiment of a display unit installing structure for a refrigerator according to the present invention.

FIG. 18 is a plan view showing a ninth embodiment of a display unit installing structure for a refrigerator according to the present invention.

FIG. 19 is a plan view showing a tenth embodiment of a display unit installing structure for a refrigerator according to the present invention.

FIG. 20 is a plan view showing an eleventh embodiment of a display unit installing structure for a refrigerator according to the present invention.

FIG. 21 is a side sectional view showing the embodiment shown in FIG. 20.

BEST MODE

Hereinafter, preferred embodiments of a display unit installing structure for a refrigerator according to the present invention will be described in detail with reference to the accompanying drawings.

FIG. 2 shows a state where a display unit is withdrawn by using a display unit installing structure for a refrigerator according to a first embodiment of the present invention, and FIGS. 3 and 4 show a state where the display unit is accommodated according to the embodiment shown in FIG. 2.

As shown in these figures, an accommodating unit 12 is provided in a front surface of a refrigerator door 10. The accommodating unit 12 is formed into a flat box with an open front face. In this embodiment, the accommodating unit 12 is defined by a recess member 20 installed on a front surface of the door 10. That is, the recess member 20 is installed on the front surface of the door 10, and thus, the accommodating unit 12 can be defined by a concave portion of the recess member 20. Alternatively, the accommodating unit 12 can be formed integrally with the front surface of the door 10.

A display unit 30 is retractably installed in the accommodating unit 12. Thus, it is preferred that the accommodating unit 12 and the display unit 30 be formed to correspond to each other in view of their shapes. The display unit 30 displays a variety of information to the outside and receives operating signals for performing the information display. For example, the display unit 30 is provided with a function of receiving a television broadcast or connecting to the Internet.

Further, a link mechanism 40 is provided to guide a withdrawing/accommodating motion of the display unit 30. The link mechanism 40 comprises a pair of link members 42 and 44 which are arranged vertically in parallel with each other.

Further, since both ends of the link members 42 and 44 are pivotally connected to a bottom surface of the recess member 20 and a rear surface of the display unit 30, respectively, the link members 42 and 44 can be pivoted on rear ends thereof, respectively, in a vertical direction. Thus, the display unit 30 is moved horizontally due to its vertical pivot motion such that it can be received in and withdrawn from the accommodating unit 12. That is, the display unit 30 is pivoted on supporting points corresponding to the rear ends of the link members 42 and 44 and consequently performs a motion along an arc with a predetermined radius. Although it has not been illustrated herein, it is apparent that the link members 42 and 44 can be configured to be withdrawn from the accommodating unit 12 while the display unit 30 is pivoted in a horizontal direction.

Further, in this embodiment, the link mechanism 40 comprises a pair of link members 42 and 44 each of which is a one-point linkage. Thus, the display unit 30 is withdrawn to the outside to the outside of the accommodating unit 12 while it is being kept at a vertical state. However, if the link mechanism 40 is constructed into a single one-point linkage or configured to include the link members each of which is a multi-point linkage, e.g. a two-point linkage, a tilting angle of the display unit 30 can also be adjusted.

Furthermore, a plurality of locking protrusions 14 are provided on the bottom surface of the accommodating unit 12. Each of the locking protrusions 14 protrudes forward from the bottom surface of the accommodating unit 12 by a predetermined length. A plurality of locking grooves 31 in which the plurality of locking protrusions 14 are fitted are also formed in the rear surface of the display unit 30. Each of the locking grooves 31 is depressed inward in the rear surface of the display unit 30 by a depth equal to the length of the locking protrusion 14.

The locking protrusions and grooves 14 and 31 function to prevent the display unit 30 from being inadvertently withdrawn from the accommodating unit due to the impact, which may be generated during the opening/closing operation of the door 10, when the display unit 30 is received in the accommodating unit 12. To this end, the locking protrusions 14 can be selectively inserted in the locking grooves 31 when the display unit 30 is received in or withdrawn from the accommodating unit 12.

In order to allow the locking protrusions 14 to be inserted in the locking grooves 31 more exactly and smoothly, it is preferred that the locking protrusions and grooves 14 and 31 be tapered such that they can be coupled with each other in the corresponding shapes. That is, as shown in FIG. 3 in a magnified scale, each of the locking protrusions 14 takes the shape of a taper of which diameter is relatively decreased from the base to the tip end. Each of the locking grooves 31 is formed to have a shape corresponding to the shape of the locking protrusion 14.

As shown in FIG. 4, the four locking protrusions 14 are provided at the corners on the bottom surface of the accommodating unit 12, respectively. Accordingly, the four locking grooves 31 are also provided at the corresponding corners on the rear surface of the display unit 30, respectively.

However, the shapes and positions of the locking protrusions and grooves 14 and 31 are not limited thereto. That is, the locking protrusions and grooves 14 and 31 may be formed in any shapes and at any positions if they can prevent the display unit 30 from being inadvertently withdrawn from the accommodating unit 12 through their mutual coupling.

Although it has been described in this embodiment that the locking protrusions and grooves 14 and 31 are protruded and depressed in a horizontal direction, both of them may be protruded and depressed in a direction corresponding to a trajectory along which the display unit 30 is received in or withdrawn from the accommodating unit 12. That is, the tip end of the locking protrusion 14 may be formed to be upward inclined in harmony with the trajectory of the display unit 30 which is moved along an arc by means of the link mechanism 40. Accordingly, the opening of the locking groove 31 will be formed to be downward inclined in correspondence with the locking protrusion 14.

In addition, a plurality of guide ribs 16 are provided on opposite side surfaces, i.e. upper, lower and lateral side surfaces of the accommodating unit 12. The guide ribs 16 serve to guide and support the display unit 30 to be received in the accommodating unit 12.

To this end, the guide ribs 16 are provided to extend from the bottom surface to the opened front of the accommodating unit 12. Further, the guide ribs 16 protrude from the side surfaces of the accommodating unit 12 in a direction in which they face each other. Therefore, when the display unit 30 is received in the accommodating unit 12, the guide ribs 16 are brought into close contact with the side surfaces of the display unit 30 such that they can support the display unit 30.

At this time, it is preferred that the guide ribs 16 have the same protruding heights as one another, as shown in FIG. 4. That is, since gaps between the side surfaces of the accommodating unit 12 and the side surfaces of the display unit 30 received therein can be equal to each other, the display unit 30 can be received in an exact position.

In addition, the guide ribs 16 are brought into close contact with the side surfaces of the display unit 30. Accordingly, the display unit cannot be inadvertently withdrawn from the accommodating unit 12, even though an external shock is exerted on the display unit 30 received in the accommodating unit 12.

Furthermore, a guide surface 16*a* is provided on an outer end of the guide rib 16. The guide surface 16*a* is inclined to be flared outwardly. The guide surface 16*a* functions to guide the display unit 30 to a proper position in the accommodating unit 12.

In this embodiment, a pair of guide ribs 16 are provided at each of the side surfaces, i.e. the upper, lower and two lateral surfaces of the accommodating unit 12. But, the number and positions of the guide ribs 16 may be determined in consideration of the sizes of the display unit 30 and the accommodating unit 12.

Mode for Invention

Next, a second embodiment of a display unit installing structure for a refrigerator according to the present invention will be described with reference to the accompanying drawings.

FIG. 5 shows a state where a display unit is withdrawn by using the display unit installing structure for a refrigerator according to the second embodiment of the present invention, FIG. 6 shows a recess member and a bracket constituting the second embodiment shown in FIG. 5, and FIG. 7 shows a process of accommodating and/or withdrawing the display unit according to the second embodiment shown in FIG. 5.

As shown in the figures, a display unit 30 is retractably installed in an accommodating unit 12 provided on a front surface of a refrigerator door 10. The accommodating unit 12 is defined by a recess member 20 provided on the front surface of the door 10. Further, a link mechanism 40 is provided to guide the accommodation and withdrawal of the display unit 30.

In this embodiment, the link mechanism 40 is composed of first and second link members 42 and 44. Rear ends of the link members 42 and 44 are pivotally connected to a front surface of a bracket 50 provided on a bottom surface of the recess member 20 corresponding to a bottom surface of the accommodating unit 12. Further, front ends of the link members 42 and 44 are pivotally connected to a rear surface of a mounting plate 60 fixed to a rear surface of the display unit 30.

The bracket 50 is detachably installed to the bottom surface of the recess member 20. Further, the mounting plate 60 is fixed to the rear surface of the display unit 30 by means of a plurality of fasteners 61.

In order to install the bracket 50, a plurality of positioning protrusions 21 and fastening slots 23 and 25 are formed on the bottom surface of the recess member 20 corresponding to the bottom surface of the accommodating unit 12. As shown in FIG. 6, each of the positioning protrusions 21 protrudes forward from and perpendicular to the bottom surface of the recess member 20. Each of the fastening slots 23 and 25 is formed lengthwise in a horizontal direction at both sides of upper and lower portions on the bottom surface of the recess member 20 by cutting out the bottom surface of the recess member 20 at predetermined width and length.

Further, the bracket 50 is formed with positioning holes 51 into which the positioning protrusions 21 are fitted and fastening and locking pieces 53 and 55 which are fitted into the fastening slots 23 and 25. Each of the positioning holes 51 is formed by cutting out a portion of the bracket 50 into a shape corresponding to a cross section of the positioning protrusion 21. Each of the fastening pieces 53 extends rearward from a top end of the bracket 50 and a tip portion thereof is then bent to be inclined upward. Each of the locking pieces 55 extends rearward from a bottom end of the bracket 50 perpendicular to a rear surface of the bracket.

In addition, a pair of fastening holes 27 and a pair of through-holes 57 are formed in the bottom surface of the recess member 20 and the bracket 50 corresponding to the recess member 20, respectively. Fasteners 59 which have passed through the through-holes 57 of the bracket 50 are fastened to the fastening holes 27 of the recess member 20, and consequently, the bracket and recess member are completely coupled with each other.

A process of fixing the bracket to the bottom surface of the recess member 20 corresponding to the bottom surface of the accommodating unit 12 will be explained as follows. First, the fastening pieces 53 are fitted into the upper fastening slots 23 among the fastening slots 23 and 25. At this time, the bracket 50 is positioned to be inclined with respect to the bottom surface of the recess member 20.

The bracket 50 is then pivoted on its upper end where the fastening pieces 53 are provided. Thus, the rear surface of the bracket 50 is brought into close contact with the bottom surface of the recess member 20. At this time, the positioning protrusions 21 are fitted into the positioning holes 51, and the bracket 50 can be then placed in a position. Simultaneously, the locking pieces 55 are fitted into the lower fastening slots 25 among the fastening slots 23 and 25, and the bracket 50 can be finally detachably installed to the bottom surface of the recess member 20. In such a state, the bracket 50 can be completely fixed to the bottom surface of the recess member 20 by using the fasteners 59.

A magnet 70 is provided at a certain position on the rear surface of the display unit 30. In such a case, the bracket 50 is made of iron or steel which can be attracted toward the magnet 70 due to a magnetic force generated from the magnet 70. Thus, if the display unit 30 is received in the accommodating unit 12, the display unit 30 can be kept at a state where it is brought into close contact with the bracket 50 due to the magnetic force generated from the magnet 70. Therefore, it is possible to prevent the display unit 30 from being inadvertently withdrawn from the accommodating unit 12 due to an external shock.

Furthermore, a coil spring 80 is provided to impart an elastic force to the display unit 30 such that the display unit 30 can be received in and withdrawn from the accommodating unit 12. Both ends of the coil spring 80 are fixed to the rear end of the first link member 42 and a front end of the second link member 44, respectively. That is, both ends of the coil spring 80 are fixed to the rear end of the first link member 42 connected to a front surface of the bracket 50 and the front end of the second link member 44 connected to a rear surface of the mounting plate 60, respectively.

Positional relationship between the link members 42 and 44 when the display unit 30 is received or withdrawn will be discussed. As illustrated in a one-dot chain line in FIG. 7, the first and second link members 42 and 44 are arranged on a straight line when the display unit 30 is received in the accommodating unit 12. As illustrated in a two-dot chain line in FIG. 7, however, the first and second link members 42 and 44 are arranged in parallel with each other when the display unit 30 is withdrawn from the accommodating unit 12. At this time, the rear end of the first link member 42 and the front end of the second link member 44 are farthest spaced apart from each other.

In other words, the coil spring 80 is maximally stretched at a point where the first and second link members 42 and 44 are arranged in parallel with each other while the display unit 30 is received in or withdrawn from the accommodating unit 12. Further, a distance between the rear end of the first link member 42 and the front end of the second link member 44 is decreased away from such a point while the display unit 30 is received or withdrawn, and thus, a stretched amount of the coil spring 80 is decreased.

Here, a process of causing the display unit 30 to be received or withdrawn will be explained on the assumption that a P point is a point where the rear end of the first link member 42 and the front end of the second link member 44 are farthest spaced apart from each other such that the coil spring 80 can be maximally stretched.

In a state where the display unit 30 is received as illustrated in a one-dot chain line, the coil spring 80 is not stretched. In such a state, if the display unit 30 is pulled forward, the display unit 30 starts to be withdrawn while being pivoted upward and simultaneously moved forward. Therefore, the link members 42 and 44 are pivoted and the coil spring 80 starts to be stretched accordingly.

Further, when the display unit 30 continues to pivoting upward and also moving forward and then reaches the point P, the coil spring 80 is stretched to the utmost. Thus, the coil spring has a maximum elastic restoring force. However, if the display unit 30 passes through the point P due to a withdrawal action, a stretched amount of the coil spring 80 is decreased. From this time on, the elastic restoring force of the coil spring 80 will be exerted on the display unit.

After passing through the point P, therefore, the display unit 30 is subjected to an elastic restoring force of the coil spring 80 and then fully withdrawn from the accommodating unit 12 as shown in a solid line. That is, if a user moves the display unit 30 up to the point P in the process of withdrawing the display unit 30, the display unit 30 can be readily withdrawn due to the elastic restoring force of the coil spring after passing through the point P.

Further, when the display unit 30 is again received in the accommodating unit 12 from a state where the display unit has been withdrawn as shown in a solid line, the elastic restoring force of the coil spring 80 is exerted on the display unit in the same way as the aforementioned withdrawal process. That is, when the display unit 30 is received in the accommodating unit 12, the coil spring 80 is stretched up to the point P. However, after the display unit 30 has passed through the point P, the elastic restoring force of the coil spring 80 assists the display unit 30 in being readily received in the accommodating unit 12.

Hereinafter, a display unit installing structure for a refrigerator according to a third embodiment of the present invention will be explained.

FIG. 8 shows the third embodiment of the display unit installing structure according to the present invention.

As shown in the figure, a link member 42 of the link mechanism 40 is a two-point linkage. Thus, the link mechanism 40 can guide the accommodation/withdrawal of the display unit 30 and simultaneously adjust the tilting angle of the display unit 30.

Further, the display unit 30 is provided with a handle 31. In the illustrated embodiment, the handle 31 is formed concave by inwardly depressing a portion of a bottom surface of the display unit 30. So long as the handle 31 can be used to allow a user to pull the display unit 30 received in the accommodating unit 12 with his/her hand, it can formed in any shape.

Further, the other configuration for accommodating and/or withdrawing the display unit 30, including the accommodating unit 12, the recess member 20, the bracket 50 and the mounting plate 60, is the same as that of the second embodiment of the present invention.

Meanwhile, FIG. 9 shows a fourth embodiment of a display unit installing structure for a refrigerator according to the present invention, and FIGS. 10 and 11 show an operating mode of the display unit installing structure of the embodiment shown in FIG. 8.

As shown in these figures, in this embodiment, a connector 70 is provided between the display unit 30 and a front end of the link mechanism 40. The display unit 30 can be tilted with respect to the front end of the link mechanism 40 by means of the connector 70.

More specifically, the mounting plate 60 is fixed to a rear surface of the display unit 30. The connector 70 is installed to the rear surface of the mounting plate 60 such that it can be tilted in a horizontal direction. The front end of the link mechanism 40 is pivotally connected to the connector 70. A rear end of the link mechanism 40 is pivotally connected to a front surface of the bracket 50. According to this embodiment, therefore, the display unit 30 can be tilted by means of the link mechanism 40 in a vertical direction and by means of the connector 70 in a horizontal direction.

Next, a fifth embodiment of a display unit installing structure for a refrigerator will be described in detail with reference to the accompanying drawings.

FIG. 12 is a major part of the refrigerator in which a display unit is mounted using the display unit installing structure for a refrigerator according to the present invention and FIG. 13 is a plan view of the embodiment shown in FIG. 12.

As shown in these figures, an accommodating unit 12 provided on the front surface of the door 10 and a display unit 30 retractably installed to the accommodating unit 12 are the same as those described in the first embodiment of the present invention. A rear surface 32 of the display unit 30 is made of the same material as that of the front surface of the door 10.

In this embodiment, a link mechanism 40 is provided to guide the withdrawal and accommodation of the display unit 30 and to pivotally support the display unit 30 on a horizontal surface. As shown in FIG. 13, the link mechanism 40 is composed of a pair of link members 42 and 44 symmetrical with each other. Further, both ends of the link member 42 or 44 are pivotally connected to the accommodating unit 12 and the display unit 30, respectively.

The rear ends of 42a and 44a of the link members 42 and 44 are pivotally connected to an inner side of the accommodating unit 12, preferably a ceiling surface 14 and/or bottom surface 16 of the accommodating unit 12. At this time, the rear ends 42a and 44a of the link members 42 and 44 are supported such that they can be tilted in a horizontal direction. For example, the rear ends 42a and 44a of the link members 42 and 44 may be installed in a pair of rail grooves 18 and 19 with a predetermined length, respectively, such that they can be slid along the grooves which are formed symmetrically in a horizontal direction on the ceiling surface 14 and/or bottom surface 16 of the accommodating unit 12.

Although it has not been illustrated in the figures, the rear ends 42a and 44a of the link members 42 and 44 may be configured to be slid in a horizontal direction within the interior of the door 10 corresponding to the interior or rear of the accommodating unit 12.

The front ends 42a and 44a of the link members 42 and 44 are pivotally connected to a top surface 34 and/or a bottom surface 36 of the display unit 30, respectively. As shown in FIG. 13, the front ends 42a and 44a of the link members 42 and 44 are pivotally hinged or pin-connected on a point on the top and/or bottom surface 34 and 36 of the display unit 30, preferably a middle point on the surface in a horizontal direction. Since the front ends 42a and 44a of the link members 42 and 44 are pivotally connected to a point on the top and/or bottom surface 34 and 36 of the display unit 30 as described above, the display unit 30 can be substantially pivoted on a single point to which the front ends 42a and 44a of the link members 42 and 44 are connected.

Next, a process of operating the display unit using the display unit installing structure for a refrigerator according to the fifth embodiment of the present invention will be explained in detail with reference to FIG. 14.

FIG. 14 (a) illustrates a state where the display unit 30 is received in the accommodating unit 12. At this time, the display unit 30 is maintained at a plane parallel to the front surface of the door 10. Even in such a state, the display unit 30 can be utilized.

FIG. 14 (b) illustrates a state where the display unit 30 is withdrawn from the accommodating unit 12 and protrudes forward from the door 10. At this time, the link mechanism 40 is moved from a position shown in a dotted line to a position shown in a solid line as shown in FIG. 13.

When the display unit 30 is withdrawn from the accommodating unit 12 as shown in FIG. 14 (b), the display unit 30 can be pivoted clockwise or counterclockwise in a horizontal direction on the middle point to which the front ends of the link mechanism 40 are connected.

Therefore, in a case where the display unit is not utilized for a long time to carry a refrigerator or deposit a refrigerator in storage, the display unit 30 is rotated clockwise or counterclockwise in a horizontal direction as shown in FIG. 14 (c). Thus, the rear surface 32 of the display unit 30 is exposed to the outside.

Further, FIG. 14 (d) illustrates a state where the display unit 30 is again pushed and received in the accommodating unit 12 in a state shown in FIG. 14 (c). That is, the rear surface 32 of the display unit 30 is exposed to the outside in a state where it is coplanar with the front surface of the door 10.

Furthermore, the rear surface 32 of the display unit 30 is made of the same material as that of the front surface of the door 10. Therefore, the display unit 30 that is not utilized for a while can be protected, and its aesthetic function can also be improved since the front surface of the door 10 can be planar and smooth.

Meanwhile, when the display unit 30 is withdrawn from the accommodating unit 12 as shown in FIG. 14 (b), the display unit 30 can be substantially pivoted in a horizontal direction. Therefore, since the display unit 30 can be tilted at a certain angle in a horizontal direction depending on the position of a user, a wide field of vision can be obtained.

As described above, the rear surface 32 of the display unit 30 is made of the same material as that of the door 10 in this embodiment. Thus, as shown in FIG. 14 (d), an external appearance of the front surface of the door 10 provides an integral sense of feeling in a state where the display unit 30 is received in the accommodating unit 12 such that its rear surface 32 is exposed to the outside.

However, the configuration of the rear surface 32 of the display unit 30 is not limited thereto. For example, a white board 32 can be provided on the rear surface of the display unit 30 as illustrated in a sixth embodiment of the present invention shown in FIG. 15. A user can make a note on the white board using a specific writing tool or erase the note. Therefore, a user can make a note on the white board 32 in a state where the display unit 30 is received in the accommodating unit 12 such that the rear surface thereof is exposed to the outside.

In a seventh embodiment of the present invention shown in FIG. 16, a memo board 32 is also provided on a rear surface of the display unit 30. The memo board 32 is composed of a base plate formed on the rear surface of the display unit 30 to correspond to the surface shape of the display unit 30, a synthetic resin film of which a rear surface is brought into close contact with a front surface of the base plate to allow a user to make a note thereon, and an eraser lever 34 for erasing the written note by separating the film from the base plate.

That is, when a pressure is exerted on a front surface of the synthetic resin film using a writing tool, a portion of the synthetic resin film to which the pressure is exerted is brought into close contact with the front surface of the base plate to thereby write a note thereon. Then, the note can be erased by separating the synthetic resin film and the base plate which have been brought into close contact with each other by said eraser lever 34.

FIG. 17 shows an eighth embodiment of a display unit installing structure for a refrigerator according to the present invention.

In this embodiment, a link mechanism 40 is composed of first and second link members 42 and 44 each of which is a two-point link. Rear ends of the link members 42 and 44 are pivotally connected to the accommodating unit 12. Preferably, the rear ends of the link members 42 and 44 are connected to the ceiling surface 14 and/or bottom surface 16 of the accommodating unit 12. At this time, positions to which the rear ends of the link members 42 and 44 are connected are symmetric with the horizontal middle point on the ceiling surface 14 and/or bottom surface 16 of the accommodating unit 12. Further, front ends of the link members 42 and 44 are also pivotally connected to the horizontal middle point on the top surface 34 and/or bottom surface 36 of the display unit 30. Therefore, by means of the link mechanism 40, the display unit 30 can be withdrawn from the accommodating unit 12 or tilted in a horizontal direction in a state where the display unit has been withdrawn from the accommodating unit.

FIG. 18 shows a ninth embodiment of a display unit installing structure for a refrigerator according to the present invention.

As shown in the figure, an accommodating unit 12 is provided at a front surface of the refrigerator door 10. The accommodating unit 12 is defined by a recess member 20. Further, the recess member 20 is installed at the front surface of the door 10. At this time, both surfaces of an outer part defining a front external appearance of the door 10 and the recess member 20 are spaced apart by a predetermined distance from each other to create an operating space S therebetween.

Further, installation grooves 14 are provided, respectively, at both side surfaces of the recess member 20 corresponding to both side surfaces of the accommodating unit 12. Each of the installation grooves 14 is formed by depressing a portion of the side surface of the recess member 20 inward into the operating space S. A through-hole 16 is formed through a portion of an inner side of the installation groove 14.

The display unit 30 is received in the accommodating unit 12. Further, a locking means is provided to prevent the display unit 30 received in the accommodating unit 12 from being inadvertently withdrawn due to an external shock. The locking means includes a stopper 51, a stopping groove 31 in which the stopper 51 is inserted, and a coil spring 55 that imparts an elastic force to the stopper 51.

The stopper 51 is installed through the through-hole 16. Thus, the stopper 51 should have a relatively small outer diameter as compared with an inner diameter of the through-hole 16. A tip end of the stopper 51 is located within the accommodating unit 12. Further, a rear end of the stopper 51 is located within the installation space S.

A catching protrusion 52 is provided at the tip end of the stopper 51 which is located within the accommodating unit 12. The catching protrusion 52 is a portion which is substantially inserted in the stopping groove 31. Further, a catching flange 53 is provided at the rear end of the stopper 51 which is located within the operating space S. Each of the catching protrusion 52 and the catching flange 53 has a relatively large diameter as compared with that of the through-hole 16.

When it is inserted in the installation groove 14, the stopper 51 allows the display unit 30 to move in a direction perpendicular to a direction in which the display unit 30 is received into the accommodating unit 12. In this embodiment, since the stoppers 51 are installed, respectively, at both side surfaces of the recess members 20, they can be moved in a right and left direction as viewed from this figure.

The stopping grooves 31 are formed at positions on both side surfaces of the display unit 30 corresponding to the stoppers 51, respectively. Each of the stopping grooves 31 is formed by inward depressing a portion on the side surface of the display unit 30. The stopping groove 31 is formed to have a shape corresponding to the catching protrusion 52.

In this embodiment, both the catching protrusion 52 provided at the tip end of the stopper 51 and the corresponding stopping grove 31 are shaped as a spherical surface. This is because the stopper 51 can be easily inserted in or detached from the stopping groove 31 as well as the withdrawal/accommodation of the display unit 30 cannot be hindered by the stopper 51. However, the shapes of the catching protrusion 52 and the stopping groove 31 are not limited to a spherical shape. For example, even though the catching protrusion 52 and the stopping groove 31 are shaped as corresponding conical shapes that are complementary to each other, the aforementioned effects may be expected.

The coil spring 55 imparts an elastic force to the stopper 51 in a direction in which the stopper 51 is inserted into the stopping groove 31. The coil spring 55 is installed to surround the stopper 51 in a state where both ends thereof are supported on an inner surface of the installation groove 14 and one side of the supporting protrusion 52, respectively. The coil spring 55 prevents the stopper 51 from being inadvertently escaped from the stopping groove 31.

Reference numeral 40, not yet illustrated, designates a link mechanism. The link mechanism 40 can be configured in the same way as in the fifth embodiment of the present invention.

In this embodiment, the stopper 51 and the stopping groove 31 are installed at each of the two side surfaces of the recess member 20 and each of the two side surfaces of the display unit 30, respectively. However, the stopper 51 and the stopping groove 31 may be installed at each of the two side surfaces and/or the top and bottom surfaces of the recess member 20 and the display unit 30, respectively. The number of the stoppers 51- and stopping grooves 31 may be greater or lower than two (2) depending on the size and shape of the accommodating unit 12 or the display unit 30.

Now, the operation of the stopper 51 when the display unit 30 is withdrawn or received will be explained. In a state where the display unit 30 is received in the accommodating unit 12, the stopper 51 is inserted in the stopping groove 31. At this time, the stopper 51 cannot be inadvertently escaped from the stopping groove 31 due to the elastic force of the coil spring 55.

Therefore, even though an external force is applied to the display unit 30 while the refrigerator door is opened or closed, the display unit 30 is not inadvertently withdrawn from the accommodating unit 12. Further, the vibration generated when the door 10 is opened or closed can also be absorbed by means of the elasticity of the coil spring 55.

If a user pulls forward the display unit 30 to withdraw the display unit 30 from the accommodating unit 12 in such a state, the stopper 51 starts to be escaped from the stopping groove 31. At this time, since the stopper 51 and the stopping groove 31 are shaped as a mutually corresponding spherical surface, the stopper 51 can be easily escaped from the stopping groove 31.

The stopper 51 which has been escaped from the stopping groove 31 is pushed into the installation groove 14 by means of both side surfaces of the display unit 30. At this time, the coil spring 55 is in a compressed state. Further, after the display unit 30 has been completely withdrawn from the accommodating unit 12, the stopper 51 again protrudes from the installation groove 14, i.e. into the accommodating unit 12.

The process of receiving the display unit 30 again into the accommodating unit 12 is performed in a reverse order to the aforementioned withdrawal process. That is, if a user pushes the display unit 30 rearward into the accommodating unit 12 to receive the former into the latter, the stopper 51 is pushed unto the accommodating unit 12 by means of the display unit 30. At this time, since the catching protrusion 52 is shaped as a spherical surface, the accommodation of the display unit 30 is not hindered by the stopper 51.

Further, after the display unit 30 has been completely received in the accommodating unit 12, the stopper 51 protrudes again into the accommodating unit 12 due to the elastic force of the coil spring 55 and is then inserted in the stopping groove 31. Thus, the display unit 30 cannot be inadvertently escaped from the accommodating unit 12.

In the meantime, FIG. 19 shows a tenth embodiment of a display unit installing structure for a refrigerator according to the present invention.

As shown in this figure, a recess member 20 defining an accommodating unit 12 is installed on a front surface of the refrigerator door 10. A display unit 30 is installed in the accommodating unit 12 such that it can be received or withdrawn by means of a link mechanism 40. In addition, an operating space S is provided between an outer part defining a front external appearance of the door 10 and both side surfaces of the recess member 20. Further, an installation groove 14 is formed on each of the side surfaces of the recess member 20 by depressing a portion of the side surface of the recess member inward into the operating space S. A through-hole 16 is formed through an inner surface of the installation groove 14. The configuration of this embodiment is the same as that of the ninth embodiment of the present invention.

In the meantime, a slot 13 is formed in the front surface of the door 10 corresponding to a front face of the operating space S. The slot 13 is formed by cutting out a portion on a front surface of the recess member 20 by a predetermined length in a horizontal direction.

An operating lever 61 is provided to prevent the display unit 30 from being inadvertently withdrawn from the accommodating unit 12 due to an external shock. The operating lever 61 is L-shaped. The operating lever 61 is positioned within the operating space S and the installation groove 14. Further, both ends of the operating lever 61 pass through the slot 13 and the through-hole 16, respectively, to protrude forward from the door 10 and into the accommodating unit 12.

The operating lever 61 is installed to be movable in a horizontal direction along the slot 13. To this end, an operating grip 62 is provided at one end of the operating lever 61 which protrudes forward through the door 10 to the outside. The operating grip 62 is a portion which a user grip and manipulates to move the operating lever 61. The operating grip 62 is sized not be introduced into the operating space S through the slot 13.

In this embodiment, the operating lever 61 is provided at both side surfaces of the recess member 20 corresponding to both sides of the accommodating unit 12. However, the operating lever 61 may be provided at top and bottom surfaces of the recess member 12. In such a case, the operating grip 62 will be moved in a vertical direction.

Meanwhile, a catching protrusion 63 is provided at the other end of the operating lever 61 which protrudes into the accommodating unit 12. The catching protrusion 63 is sized not to be introduced into the operating space S through the through-hole 16. An inclined guide surface 64 is provided on a tip end of the catching protrusion 63. The inclined guide surface 64 is formed to be flared toward the outside. The inclined guide surface 64 serves to prevent the display unit 30 from being hindered by the catching protrusion 63 when the display unit 30 is received into the accommodating unit 12.

In addition, a catching groove 31 is formed on both side surfaces of the display unit 30. The catching protrusion 63 is selectively inserted in the catching groove 31 by means of the horizontal motion of the operating lever 61. That is, the catching protrusion 63 is kept to be inserted in the catching groove 31 when the display unit 30 is received in the accommodating unit 12. Due to the horizontal motion of operating grip, the display unit 30 can be withdrawn from the accommodating unit 12.

Further, a coil spring 65 is provided to impart an elastic force to the operating lever 61 in a direction in which the catching protrusion 63 is inserted in the catching groove 31. The coil spring 65 is installed to surround a portion of the operating lever 61. At this time, both ends of the coil spring 65 are supported on an inner side surface of the installation groove 14 and a surface of the catching protrusion 63. Due to the elastic force of the coil spring 65, therefore, the catching protrusion 63 cannot be inadvertently escaped from the catching groove 31.

Furthermore, the operation of the operating lever 61 when the display unit 30 is received in or withdrawn from the accommodating unit 12 will be discussed. In a state where the display unit 30 is received in the accommodating unit 12, the catching protrusion 63 is kept to be inserted in the catching groove 31. At this time, due to the elastic force of the coil spring 65, the catching protrusion 63 cannot be inadvertently escaped from the catching groove.

Therefore, even though an external shock is generated while the refrigerator door is opened or closed, the display unit 30 is not inadvertently withdrawn from the accommodating unit 12. Further, the vibration generated while the door 10 is opened or closed can be absorbed due to the elasticity of the coil spring 65.

If a user merely moves the two operating grips 62 far away from each other, i.e. in a horizontal direction, along the slot 13 in such a state, the display unit 30 is withdrawn from the accommodating unit 12. At this time, the operating lever 61 and the catching protrusion 63 are moved in the same direction as the operating grip 62. Thus, the catching protrusion 63 is escaped from the catching groove 31 and then positioned within the installation groove 14.

If the catching protrusion 63 is escaped from the catching groove 31 in this way, the display unit 30 can be withdrawn from the accommodating unit 12. After the display unit 30 is completely withdrawn from the accommodating unit 12, a force needed for moving the operating grip 62 is eliminated. Thus, the catching protrusion 63 again protrudes from the installation groove into the accommodating unit 12 due to the elastic force of the coil spring 65.

Next, an eleventh embodiment of a display unit installing structure for a refrigerator according to the present invention will be described in detail with reference to the accompanying drawings.

FIG. 20 shows an eleventh embodiment of the display unit installing structure for a refrigerator according to the present invention, and FIG. 21 shows a side sectional view of the embodiment shown in FIG. 20.

In this embodiment as shown in these figures, a seating groove 38 is provided on the top and/or bottom surface(s) of a display unit 30. The seating groove 38 is formed by depressing a portion of a rear end on the top surface 34 and/or bottom surface 36 in an upward and/or downward direction, respectively. The seating groove 38 is preferably formed at a depth corresponding to the sum of thickness of a pair of link members 42 and 44 constructing a link mechanism 40.

As shown in FIG. 21, in a state where the display unit 30 is received in the accommodating unit 12, the link members 42 and 44 are securely seated in the seating groove 38. Thus, the link members 42 and 44 are not exposed to the outside. Therefore, the aesthetic sense of the front surface of the refrigerator door 10 is excellent even in a state where the display unit 30 is received in the accommodating unit 12.

The configuration of the link mechanism 40 for guiding the withdrawal and accommodation of the display unit 30 and tiltably supporting the withdrawn display unit 30 at a predetermined angle according to this embodiment is the same as that of the fifth embodiment of the present invention.

It is apparent to those skilled in the art that various modifications and changes can be made to the present invention within the scope of the basic technical spirit of the present invention. Therefore, the present invention should be construed as defined in the appended claims.

INDUSTRIAL APPLICABILITY

As described above, a display unit installing structure for a refrigerator according to the present invention so configured has the following advantageous effects.

First, the display unit is tiltably supported at a predetermined angle by means of the link mechanism. Thus, since a field of vision can be obtained by tilting the display unit at a predetermined angle depending on user positions, a user can efficiently utilize the display unit.

In addition, since the display unit can be retractably received in the accommodating unit, the heat transfer between the interior of the refrigerator and the display unit can be minimized as well as effective heat radiation from the display unit can be achieved. Therefore, the operating reliability of the display unit can be obtained and the efficiency of the refrigerator can also be improved.

Further, the present invention is configured in such a manner that the front or rear surface of the display unit can be selectively exposed to the outside according to whether the display unit is currently utilized. Thus, the design of the front external appearance of the door can be diversified, and the aesthetic sense can be consequently enhanced.

Furthermore, as described above, if the display unit is received such that its rear surface is exposed to the outside, a component provided on the front surface of the display unit for the information display or operating signal input is not exposed to the outside. Thus, since the display unit can be safely protected against the external shock when the display unit is not used for a long time or when the refrigerator is carried or deposited into storage, the durability thereof can be increased.

In the meantime, a white board or memo board can be provided on the rear surface of the display unit. Therefore, since a note can be easily made on the white or memo board, a refrigerator can be utilized in various purposes. In addition, since other means used to make a note needs not be installed in a kitchen, the external appearance of the refrigerator and the environment in the kitchen can be neat and clean.

Finally, the display unit is not inadvertently withdrawn from the accommodating unit by using various types of locking means. Therefore, the probability that the display unit may be damaged when the display unit is inadvertently withdrawn from the accommodating unit while using the refrigerator can be avoided.

The invention claimed is:

1. A display unit installing structure for a refrigerator, comprising:
   an accommodating unit which is formed by depressing a portion on a front surface of a door and in which a display unit for displaying a variety of information thereon and inputting operating signals are retractably installed;
   a link mechanism for guiding accommodation and withdrawal of the display unit and tiltably supporting the display unit withdrawn from the accommodating unit at a predetermined angle; and
   a locking means for preventing the display unit from inadvertently escaping from the accommodating unit; and
   a guide means for guiding the display unit to be received in the accommodating unit,
   wherein the locking means includes:
      at least one locking protrusion provided on one of the accommodating unit and the display unit; and
      at least one locking groove provided on the other of the accommodating unit and display unit such that the locking protrusion is selectively inserted in the locking groove as the display unit is received in or withdrawn from the accommodating unit,
   wherein the locking protrusion is shaped as a taper of which diameter is decreased from a base toward a tip end thereof, and the locking groove is shaped as a taper corresponding to the shape of the locking protrusion, wherein the locking protrusion and groove are protruded from a bottom surface of the accommodating unit and depressed into a rear surface of the display unit, respectively, in accordance with a trajectory along which the display unit is received into or withdrawn from the accommodating unit by means of the link mechanism,
   wherein the guide means includes at least one pair of guide ribs which are provided on opposite side surfaces of the accommodating unit and brought into close contact with side surfaces of the display unit received in the accommodating unit to support the display unit thereon, and
   wherein the guide ribs are formed by protruding a portion of the side surface of the accommodating unit in a direction toward the opposite side surfaces, and a guide surface inclined to be flared outwardly is provided at an outer end of the guide rib to guide the accommodation and withdrawal of the display unit.

2. The display unit installing structure as claimed in claim 1, wherein the link mechanism includes at least one link member of which both ends are pivotally connected to a bottom surface of the accommodating unit and a rear surface of the display unit, respectively.

3. The display unit installing structure as claimed in claim 2, wherein the link member is composed of first and second link members arranged in parallel with each other in a vertical or horizontal direction.

* * * * *